(12) United States Patent
Dai et al.

(10) Patent No.: US 11,016,222 B2
(45) Date of Patent: May 25, 2021

(54) ANTIREFLECTIVE STRUCTURE

(71) Applicant: Oji Holdings Corporation, Tokyo (JP)

(72) Inventors: Kotaro Dai, Tokyo (JP); Kei Shinotsuka, Tokyo (JP)

(73) Assignee: Oji Holdings Corporation, Tokyo (JP)

( * ) Notice: Subject to any disclaimer, the term of this patent is extended or adjusted under 35 U.S.C. 154(b) by 57 days.

(21) Appl. No.: 16/477,123

(22) PCT Filed: Jan. 19, 2018

(86) PCT No.: PCT/JP2018/001578
§ 371 (c)(1),
(2) Date: Jul. 10, 2019

(87) PCT Pub. No.: WO2018/139359
PCT Pub. Date: Aug. 2, 2018

(65) Prior Publication Data
US 2019/0361151 A1    Nov. 28, 2019

(30) Foreign Application Priority Data

Jan. 24, 2017  (JP) .............................. JP2017-010159

(51) Int. Cl.
*G02B 1/118*  (2015.01)
*B29D 11/00*  (2006.01)

(52) U.S. Cl.
CPC .......... *G02B 1/118* (2013.01); *B29D 11/0074* (2013.01)

(58) Field of Classification Search
CPC combination set(s) only.
See application file for complete search history.

(56) References Cited

U.S. PATENT DOCUMENTS

2004/0257484 A1* 12/2004 Ishitaka ............... G02B 5/1866
                                                                    349/16
2009/0323189 A1* 12/2009 Taniguchi ............. G02B 1/118
                                                                    359/599

(Continued)

FOREIGN PATENT DOCUMENTS

CN    102855817 A    1/2013
CN    205679786 U    11/2016

(Continued)

OTHER PUBLICATIONS

Matteo Burresi ,"Complex Photonic Structures for Light Harvesting", Advanced Optical Materials, Mar. 25, 2015, pp. 722-739.*

(Continued)

*Primary Examiner* — Omar S Ismail
(74) *Attorney, Agent, or Firm* — Knobbe Martens Olson & Bear LLP

(57) ABSTRACT

An antireflective structure having multiple light absorbing units each of which has a bottomed cylindrical shape, the light absorbing unit includes a bottom portion including an outer edge portion having a substantially circular shape, and a wall portion rising along the outer edge portion, and an upper side of the bottom portion is an opening portion, the average height of the wall portions being greater than or equal to 5 μm and smaller than or equal to 100 μm, an average opening diameter of the opening portions being greater than or equal to 1 μm and smaller than or equal to 10 μm, and a pinching structure configured with minute projections that stand in a group with an average pitch greater than or equal to 10 nm and smaller than or equal to 500 nm is formed on the bottom portion.

10 Claims, 7 Drawing Sheets

(56) References Cited

U.S. PATENT DOCUMENTS

| | | | |
|---|---|---|---|
| 2011/0235181 A1* | 9/2011 | Hayashibe | G02B 1/118 359/577 |
| 2012/0026591 A1 | 2/2012 | Hayashibe et al. | |
| 2012/0307368 A1 | 12/2012 | Tanaka et al. | |
| 2013/0182328 A1 | 7/2013 | Stewart et al. | |
| 2014/0320970 A1 | 10/2014 | Kamiyam et al. | |

FOREIGN PATENT DOCUMENTS

| | | |
|---|---|---|
| JP | 2010-156844 A | 7/2010 |
| JP | 2013-007905 A | 1/2013 |
| JP | 5162585 B | 3/2013 |
| JP | 2013-254026 A | 12/2013 |
| JP | 2014-123077 A | 7/2014 |
| WO | WO 2011/108208 A1 | 9/2011 |

OTHER PUBLICATIONS

Indumathi Raghu Srimathi,"Subwavelength grating based metal-oxide nanohair structures for optical vortex generation",OPTICS EXPRESS 19056,DOI:10.1364/OE.23.019056, Jul. 15, 2015,pp. 3-9.*

International Search Report issued in Application No. PCT/JP2018/001578, dated Feb. 20, 2018.

Office Action in Chinese Patent Application No. 201880006744.0 dated Jul. 23, 2020.

* cited by examiner

THE NUMBER OF UNITS

ANTIREFLECTIVE STRUCTURE

TECHNICAL FIELD

The present invention relates to an antireflective structure. The present application claims priority to JP 2017-010159, filed on Jan. 24, 2017, the contents of which are incorporated by reference herein.

BACKGROUND ART

In the related art, in order to prevent reflection of light on a surface of an optical disc such as a CD or a DVD, and on a surface of a lens, a protection film or the like, a technology has been disclosed for forming an antireflective structure configured with a diffraction pattern or fine convexities and concavities on the surface (for example, Patent Document 1).

CITATION LIST

Patent Literature

Patent Document 1: JP 5162585 B

SUMMARY OF INVENTION

Technical Problem

In Patent Document 1, as an uneven structure for antireflection, a structure has been proposed in which a diffraction pattern has a height difference between a convex portion and a concave portion that is greater than or equal to 1.5 μm and a pitch interval of a fine convex portion formed on a surface of the diffraction pattern is narrowed to be smaller than or equal to 250 nm. However, the antireflection performance (antireflection property) is not necessarily sufficient, and a structure having superior antireflection performance is required.

The present invention provides an antireflective structure having an excellent antireflection property.

Solution to Problem

[1] An antireflective structure including a plurality of light absorbing units each of which has a bottomed cylindrical shape, in which the light absorbing unit includes a bottom portion including an outer edge portion having a substantially circular shape, and a wall portion rising along the outer edge portion and an upper side of the bottom portion is an opening portion, an average height of the wall portions is greater than or equal to 5 μm and smaller than or equal to 100 μm, an average opening diameter of the opening portions is greater than or equal to 1 μm and smaller than or equal to 10 μm, and a pinching structure configured with minute projections that stand in a group with an average pitch being greater than or equal to 10 nm and smaller than or equal to 500 nm is formed on the bottom portion.

[2] The antireflective structure according to [1], in which an average height of the minute projections is greater than or equal to 0.1 μm and smaller than or equal to 4 μm.

[3] The antireflective structure according to [1] or [2], in which with the antireflective structure being looked down along a height direction of the light absorbing unit, a square region including the 100 to 200 light absorbing units is arbitrarily set, and a diameter of a minimum circle including the opening portion for each light absorbing unit included in the region is individually measured at an interval of 0.1 μm, and two or more peaks are observed in a diagram with the diameter taken as a horizontal axis, and with the number of the light absorbing units having the diameter taken as a vertical axis.

[4] The antireflective structure according to [3], in which a difference in diameter between adjacent peaks for the two or more peaks is greater than or equal to 0.3 μm.

[5] The antireflective structure according to any one of [1] to [4], in which the wall portions of the adjacent light absorbing units are integrated, and an upper end of the integrated wall portions is depressed.

Advantageous Effects of Invention

The antireflective structure of the present invention has an excellent antireflection property.

DESCRIPTION OF EMBODIMENTS

Antireflective Structure

An antireflective structure according to a first aspect of the present invention is an antireflective structure including a plurality of light absorbing units each of which has a bottomed cylindrical shape, in which the light absorbing unit includes a bottom portion including an outer edge portion having a substantially circular shape, and an upper side of the bottom portion is an opening portion. An average height of the wall portions is greater than or equal to 5 μm and smaller than or equal to 100 μm, and an average diameter of the opening portions is greater than or equal to 1 μm and smaller than or equal to 10 μm, and a pinching structure configured with minute projections that stand in a group with an average pitch being greater than or equal to 10 nm and smaller than or equal to 500 nm is formed on the bottom portion.

An example of the antireflective structure according to the present invention will be described in detail below with reference to the drawings.

Figure 1:
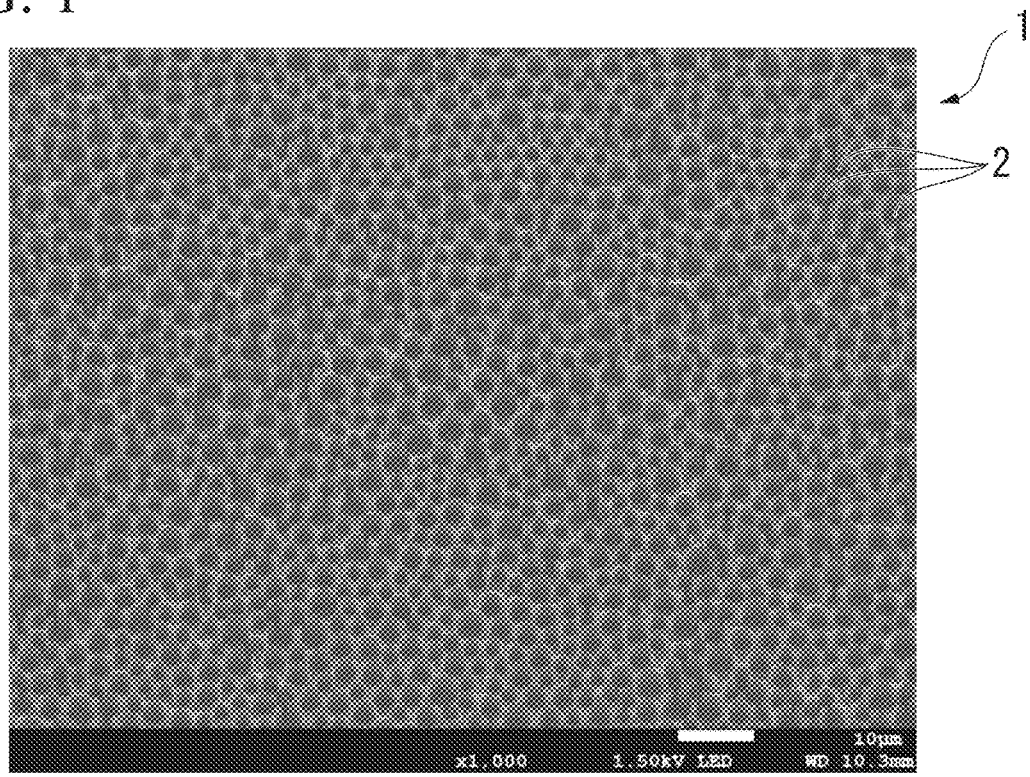
FIG. 1 is a perspective SEM image of a large number of light absorbing units 2 included in an antireflective structure 1 that is an example of the present invention.

FIG. 1 illustrates a photograph in which the antireflective structure 1 of an embodiment of the present invention is viewed obliquely from an upper side. Here, the "upper side" means an upward direction perpendicular to a bottom surface of the antireflective structure 1, and does not necessarily mean a vertically upward direction.

The antireflective structure 1 has a structure in which a large number of light absorbing units 2 are densely arranged adjacent to each other in a predetermined region on a surface of a resin sheet.

Figure 2:
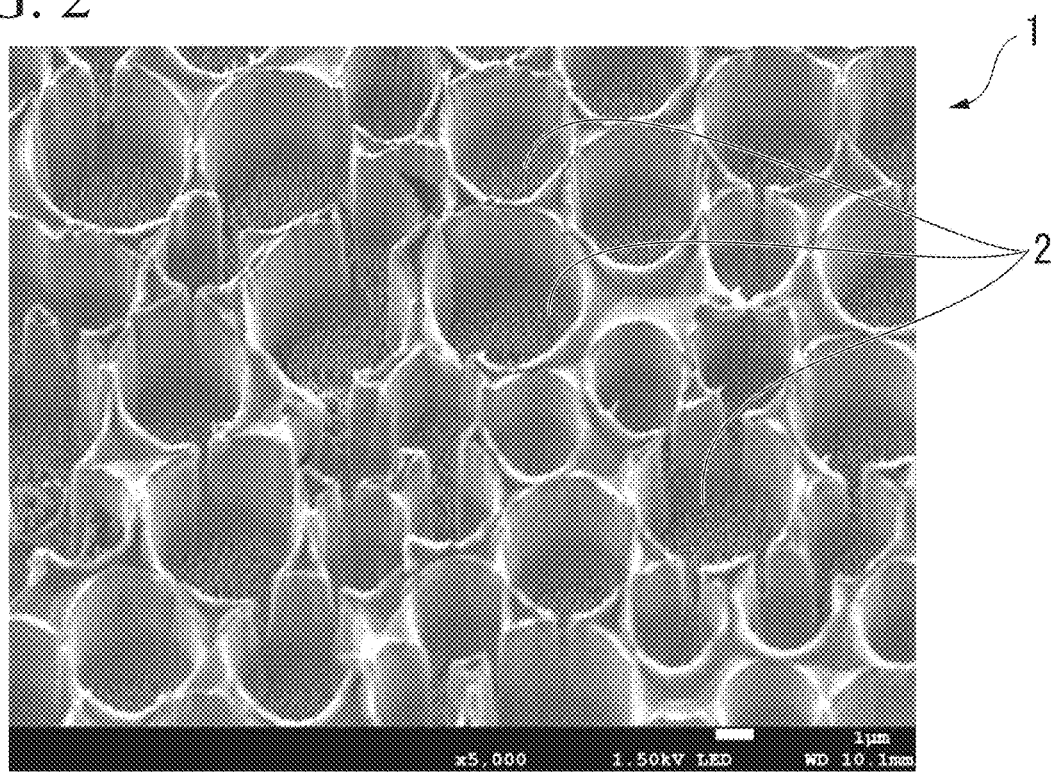
FIG. 2 is a SEM image in which a part of FIG. 1 is enlarged.
Figure 3:
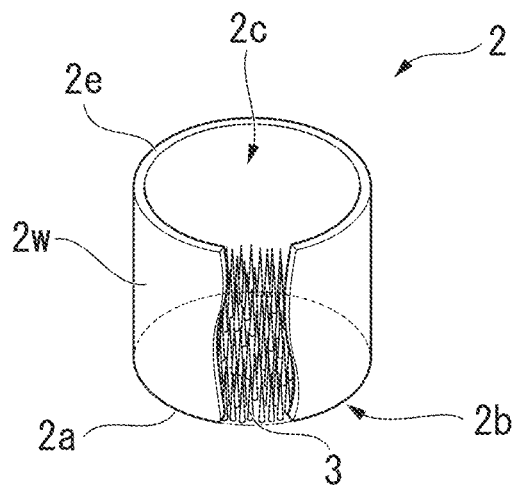
FIG. 3 is a diagram schematically illustrating the light absorbing unit 2 included in the antireflective structure 1.

FIG. 2 is a photograph in which a part of the light absorbing unit 2 in FIG. 1 is enlarged, and FIG. 3 is a perspective view schematically illustrating an example of the light absorbing unit 2.

Each of the light absorbing units 2 is configured with a bottom portion 2b including an outer edge portion 2a having a substantially circular shape, and a wall portion 2w rising along the outer edge portion 2a, and has a cylindrical body whose upper side is an opening portion 2c.

Here, what the outer edge portion 2a being an outline of the bottom portion 2b is substantially circular means that it is possible to approximate the shape of the outer edge portion 2a to a circular or elliptical shape (it is possible to assume a circular or elliptical shape close to the shape of the outer edge portion 2a) when the outer edge portion 2a is looked down along the height direction of the light absorbing unit 2. Furthermore, the substantially circular shape is a shape that does not have a substantial corner.

A shape of a space enclosed by the bottom portion 2b and the wall portion 2w of the light absorbing unit 2 having a cylindrical shape (hereinafter referred to as an "inner space part") can be approximated to a cylinder or a conical frustum. Here, a shape that can be approximated to a cylindrical shape or a conical frustum refers to a shape that can be assumed to be a cylinder or a conical frustum that is close to the shape of the inner space part.

The inner space part may have a shape that is expanded in diameter toward the upper side or a lower side. Because the light absorbing unit 2 is easy to be formed, an area of the opening portion 2c on which light is incident is increased, and the antireflection property is enhanced, the inner space part preferably has a shape that is expanded in diameter toward the upper side.

As illustrated in the schematic diagram of FIG. 3, the light absorbing unit 2 includes a wall portion 2w rising along the outer edge portion 2a. Since the outer edge portion 2a is along a substantially circular outline of the bottom portion 2b, when the wall 2w is viewed from the upper side (when the surface of the resin sheet is looked down), the wall portion 2w surrounds the bottom portion 2b so as to trace the outer edge portion 2a.

The wall portion 2w surrounding the outer edge portion 2a may be continuous along the outer edge portion 2a or may be partially lacking and discontinuous. When the wall portion 2w surrounding the outer edge portion 2a is partially lacking and discontinuous, on the lacking portion, the respective inner space parts of two adjacent light absorbing units may be communicated with each other.

The height direction of the wall portion 2w is along the normal direction of the surface of the resin sheet, that is, the height direction of the cylindrical body. A lower end of the wall portion 2w stands on the bottom portion 2b of the light absorbing unit 2, and an upper end of the wall portion 2w forms the opening portion 2c of the light absorbing unit 2. Hereinafter, an inner edge of the upper end of the opening portion 2c is referred to as an opening edge 2e.

On the bottom portion 2b surrounded by the wall portion 2w of the light absorbing unit 2, a pinching structure is formed in which a large number of minute projections 3 that protrude to a position lower than the upper end (height) of the wall portion 2w along the height direction of the wall portion 2w densely stand in a group. By focusing on a valley (concave portion) between the respective minute projections 3, the pinching structure can also be regarded as a structure in which a large number of concave portions are densely disposed on the bottom portion 2b.

Figure 4:
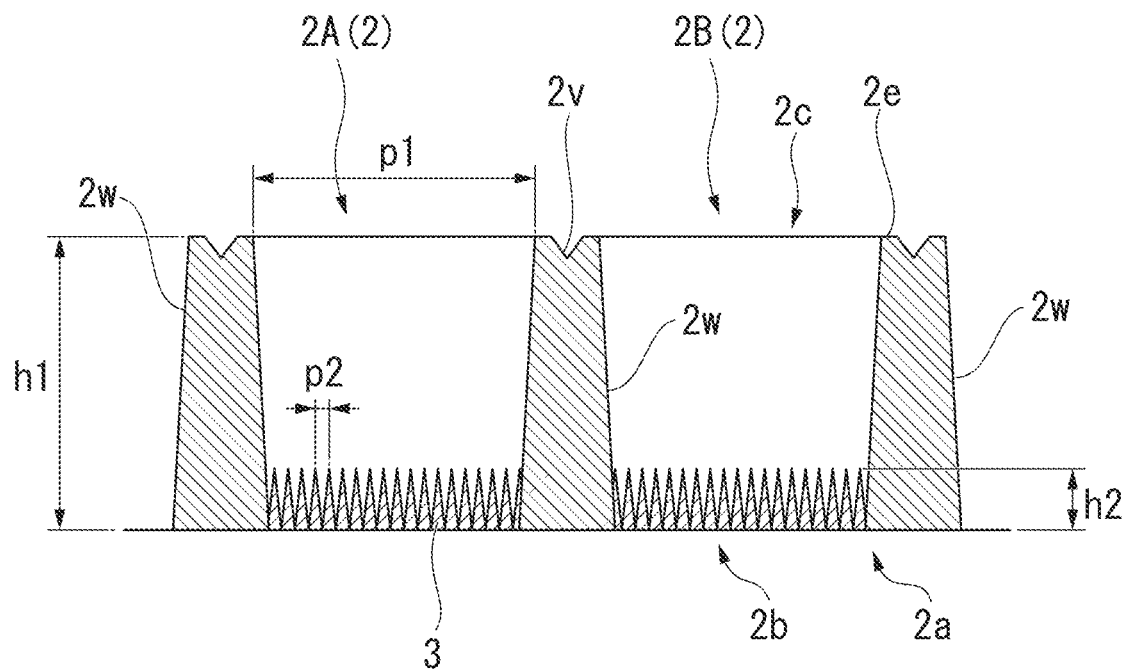
FIG. 4 is a schematic cross-sectional view of two adjacent light absorbing units 2 cut along a height direction in the antireflective structure 1.

FIG. 4 is a cross-sectional schematic view in which two adjacent light absorbing units 2 provided in the antireflective structure 1 are cut along the height direction of the light absorbing units 2.

The respective wall portions 2w separating a first light absorbing unit 2A (2) and a second light absorbing unit 2B (2) are integrated. A depression 2v is formed on a center portion of the upper end (upper surface) of the integrated wall portions 2w at a place that can be recognized as a boundary of each of the light absorbing units 2.

As for the large number of light absorbing units 2 included in the antireflective structure 1, an average of heights h1 (average height) of the wall portions 2w is greater than or equal to 5 μm and smaller than or equal to 100 μm, and is preferably greater than or equal to 7 μm and smaller than or equal to 50 μm, and is more preferably greater than or equal to 12 μm and smaller than or equal to 40 μm.

When the height h1 of the wall portion 2w is greater than or equal to 5 μm, regular reflection of incident light is sufficiently prevented, and the antireflection property exhibited by the antireflective structure 1 is further enhanced. In this specification, the "antireflection property" includes an "anti-glare property".

When the height h1 of the wall portion 2w is smaller than or equal to 100 μm, mechanical strength of the antireflective structure 1 is sufficiently maintained.

The average height of the wall portions 2w is determined as follows.

At any position of the antireflective structure 1, a cross section along the height h1 direction of the plurality of light absorbing units 2 is cut out and observed under an electron microscope, the respective heights h1 of the 100 to 200 wall portions 2w are measured, and the average height is determined as an arithmetic average of the measured heights. At this time, the height h1 of each wall portion 2w is determined as follows. That is, when a vertical distance that goes down toward the bottom portion on a left side from the highest apex (top) of the wall portions 2w to a first inflection point or saddle point in the cross section is defined as g1, and a vertical distance that goes down toward the bottom portion on a right side from the same apex to a first inflection point or saddle point is g2, the height h1 is determined by using h1=(g1+g2)/2. However, when a depression 2v is formed on the upper end (upper surface) of the wall portion 2w, the depression 2v is ignored in identifying the inflection point or saddle point.

An opening diameter p1 of the opening portion 2c is a distance across the opening edge 2e, and an average of the opening diameters p1 is greater than or equal to 1 μm and smaller than or equal to 10 µm, is preferably greater than or equal to 1.5 µm and smaller than or equal to 8.0 µm, is more preferably greater than or equal to 2.0 µm and smaller than or equal to 6.5 µm, and is even more preferably greater than or equal to 2.5 µm and smaller than or equal to 5.0 µm.

When the average opening diameter of the opening portion $2c$ is within the range described above, regular reflection of incident light is sufficiently prevented, and the antireflection property exhibited by the antireflective structure 1 is further enhanced.

The average opening diameter of the opening portions $2c$ is determined as follows.

The antireflective structure 1 is observed under an electron microscope, and is looked down along the height h1 direction of the light absorbing unit 2, a square region including the 100 to 200 light absorbing units 2 is arbitrarily set, a diameter of the smallest circle including the opening portion $2c$ is measured for each of the light absorbing units 2 across two diagonals of the square, and the average opening diameter is determined as an arithmetic average of the measured diameters.

An average of pitches p2 (average pitch) of the large number of minute projections 3 forming a pinching structure is greater than or equal to 10 nm and smaller than or equal to 500 nm, and is preferably greater than or equal to 50 nm and smaller than or equal to 300 nm, and is more preferably greater than or equal to 80 nm and smaller than or equal to 150 nm.

When the average pitch of the minute projections 3 is greater than or equal to 10 nm and smaller than or equal to 500 nm, incident light that has reached the bottom portion $2b$ of the light absorbing unit 2 is easily absorbed into the pinching structure, and the antireflection property exhibited by the antireflective structure 1 is further enhanced.

The average pitch of the minute projections 3 is determined as follows.

At any position of the antireflective structure 1, a cross section along the height direction of the plurality of light absorbing units 2 is cut out and observed under an electron microscope, and for 10 light absorbing units 2, a pitch between each of any 10 minute projections 3 on the bottom portion $2b$ of each of the 10 light absorbing units 2 and the minute projection 3 adjacent to each first-mentioned projection 3 (a distance between apexes (tops) of adjacent minute projections 3) is measured and the average pitch is determined as an arithmetic average of the measured pitches.

In the measurement method described above, the following alternative method may be applied in a case where the minute projections 3 and the like are crushed when a cross section of the antireflective structure 1 is cut out. In other words, first, a mold is produced to which shapes of the light absorbing units 2 and the minute projections 3 are transferred by applying and curing a resin composition to the surface where the light absorbing unit 2 of the antireflective structure 1 is open. Next, a cross section along the height direction of the light absorbing unit 2 transferred to the mold is cut out, and for 10 light absorbing units 2, a pitch between any 10 minute projections 3 (transferred concave portions) on the bottom portion $2b$ of each of the transferred light absorbing units 2, and the minute projection 3 adjacent to each first-mentioned projection 3 is measured, and the average pitch is determined as an arithmetic average of these pitches.

Note that the method of transferring the shapes to the mold for measuring may be applied as an alternative method in determining the average height of the wall portions $2w$, the average opening diameter of the opening portions $2c$, and the like.

Light incident on the antireflective structure 1 is incident to the inner space part from the opening portion $2c$ of the light absorbing unit 2, and is further absorbed by a pinching structure configured with the minute projections 3 that stand in a group on the bottom portion $2b$. In order to ensure that the absorption of the light is performed, an average height h2 of the minute projections 3 configuring the pinching structure is, for example, preferably greater than or equal to 0.1 µm and smaller than or equal to 4 µm, more preferably greater than or equal to 0.2 µm and smaller than or equal to 3 µm, and even more preferably greater than or equal to 0.3 µm and smaller than or equal to 2 µm.

Here, the average height h2 of the large number of minute projections 3 that forms a pinching structure is determined as follows.

At any position of the antireflective structure 1, a cross section along the height direction of the plurality of light absorbing units 2 is cut out and observed under an electron microscope. For 10 light absorbing units 2, the heights h2 of any 10 minute projections 3 on the bottom portion $2b$ of each of the light absorbing units 2 are individually measured and the average h2 is determined as an arithmetic average of the heights h2. At this time, the height h2 of each of the minute projections 3 is determined as follows. In other words, when the vertical distance that goes down toward the bottom portion on the left side from the apex of the minute projection 3 to the first inflection point or saddle point in the cross section is defined as j1, and the vertical distance that goes down toward the bottom portion on the right side from the apex of the same minute projection 3 to the first inflection point or saddle point is defined as j2, the height h2 is determined by using $h2=(j1+j2)/2$.

The above-described method of transferring the shapes to a mold for measuring may also be applied. In this case, a cross section along the height direction of the light absorbing unit 2 transferred to the mold is cut out and observed under an electron microscope. For 10 light absorbing units 2, the heights h2 of any 10 minute projections 3 on the bottom portion $2b$ of each of the transferred light absorbing units 2 (depths of the transferred concave portions) are individually measured, and the average height h2 is determined as an arithmetic average of the heights h2. Each height h2 at this time is also determined in the same manner as described above.

In order for the light incident on the antireflective structure 1 to be reliably absorbed into the pinching structure, an occupancy rate of an area of a region in which the pinching structure is formed with respect to a total area (100%) of the bottom portion $2b$ surrounded by the outer edge portion $2a$ is, for example, preferably from 70 to 100%, more preferably from 80 to 100%, and even more preferably from 90 to 100%.

The occupancy rate of the pinching structure for each of the light absorbing units 2 can be calculated by observing the bottom portion $2b$ of each of the light absorbing units 2 under an electron microscope and determining the total area of the bottom portion $2b$ thereof, and determining, by visual observation or image processing, the area of the region where the pinching structure is formed.

For any 10 light absorbing units 2 of the antireflective structure 1, the above respective occupancy rates are calculated, and an arithmetic average of the respective occupancy rates is taken as the above occupancy rate of the light absorbing unit 2 of the antireflective structure 1.

The opening diameter p1 of the opening portion 2c of each of the light absorbing units 2 provided in the antireflective structure 1 may be the same as or different from each other. When the respective light absorbing units 2 are closest-packed on the two-dimensional plane of the antireflective structure 1, the opening diameters of the respective light absorbing units 2 are preferably the same as each other. However, because arrangement of the opening portions 2c of the light absorbing units 2 becomes regular due to this closest-packing, light incident on the antireflective structure 1 may cause optical interference. From the view point of preventing this optical interference, a distribution of the opening diameters of the light absorbing units 2 configuring the antireflective structure 1 preferably does not form a single peak (monomodal) but preferably forms two or more peaks, and more preferably forms three or more peaks (multimodal).

The distribution of the opening diameters p1 of the light absorbing units 2 of the antireflective structure 1 is determined as follows.

First, the antireflective structure 1 is observed under an electron microscope, and is looked down along the height direction of the light absorbing unit 2, a square region that includes the 100 to 200 light absorbing units is arbitrarily set, and for the respective light absorbing units 2 included in the region, a diameter of a minimum circle including each opening portion 2c is individually measured at an interval of 0.1 µm. Next, a distribution diagram is created in which the measured diameter is taken as a horizontal axis, and the number of the light absorbing units 2 having the diameter is taken as the vertical axis. Connecting respective plots in a distribution diagram by a smooth line facilitates peak recognition. From the view point of preventing the optical interference, preferably two or more peaks, and more preferably three or more peaks are desirably observed in the distribution diagram.

When the peaks observed in the distribution diagram are two or more, a difference between intervals between respective two adjacent peaks is preferably greater than or equal to 0.3 µm. When the difference is greater than or equal to 0.3 µm, the arrangement of the opening portions 2c of the light absorbing units 2 packed on the two-dimensional plane of the antireflective structure 1 is not too regular, and an arrangement having moderate randomness can prevent the optical interference more easily.

An upper limit value of the difference between the intervals between the respective two peaks is, for example, preferably smaller than or equal to 10 µm, more preferably smaller than or equal to 5 µm, and even more preferably smaller than or equal to 2 µm. When these upper limit values are set, the opening portions 2c of the light absorbing units 2 can be sufficiently packed on the two-dimensional plane of the antireflective structure 1 and easily arranged with high density, which makes it possible to further enhance the antireflection property.

Figure 5:
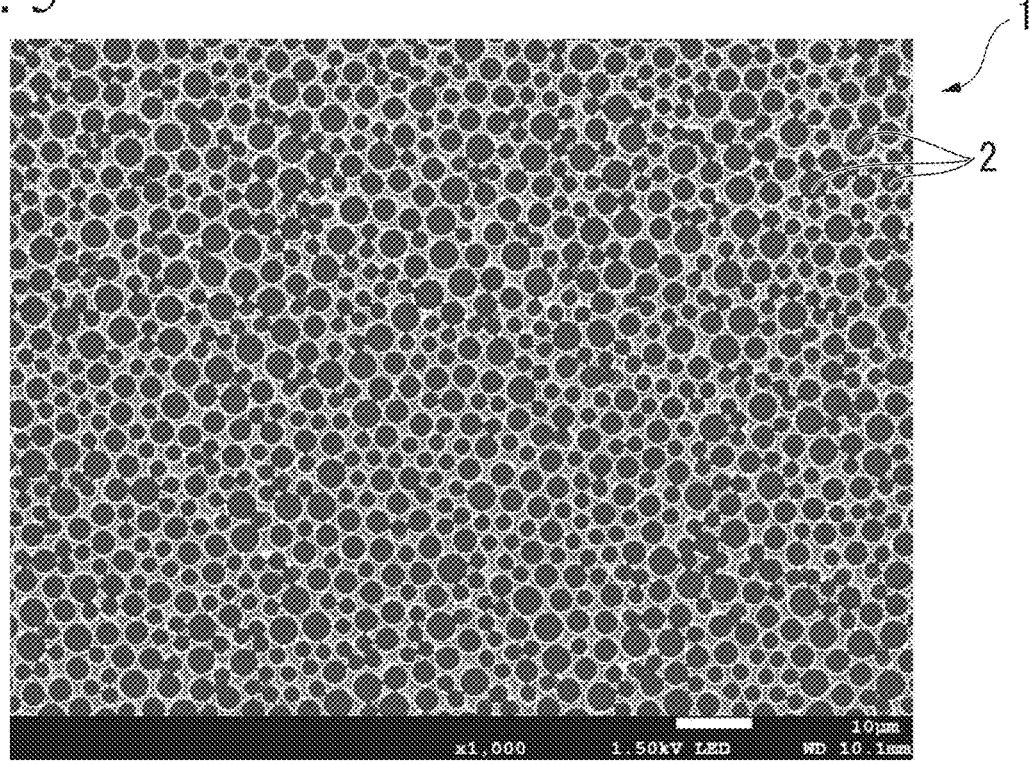
FIG. 5 is a SEM image of the upper surface of the antireflective structure 1 that is an example of the present invention, with the light absorbing unit 2 being looked down along the height direction from an upper side.

FIG. 5 illustrates an electron micrograph (SEM image) of the upper surface of the antireflective structure 1, with the antireflective structure 1 being looked down along the height direction of the light absorbing unit 2. A distribution diagram prepared by the method described above for the antireflective structure 1 is illustrated in FIG. 6.

Figure 6:
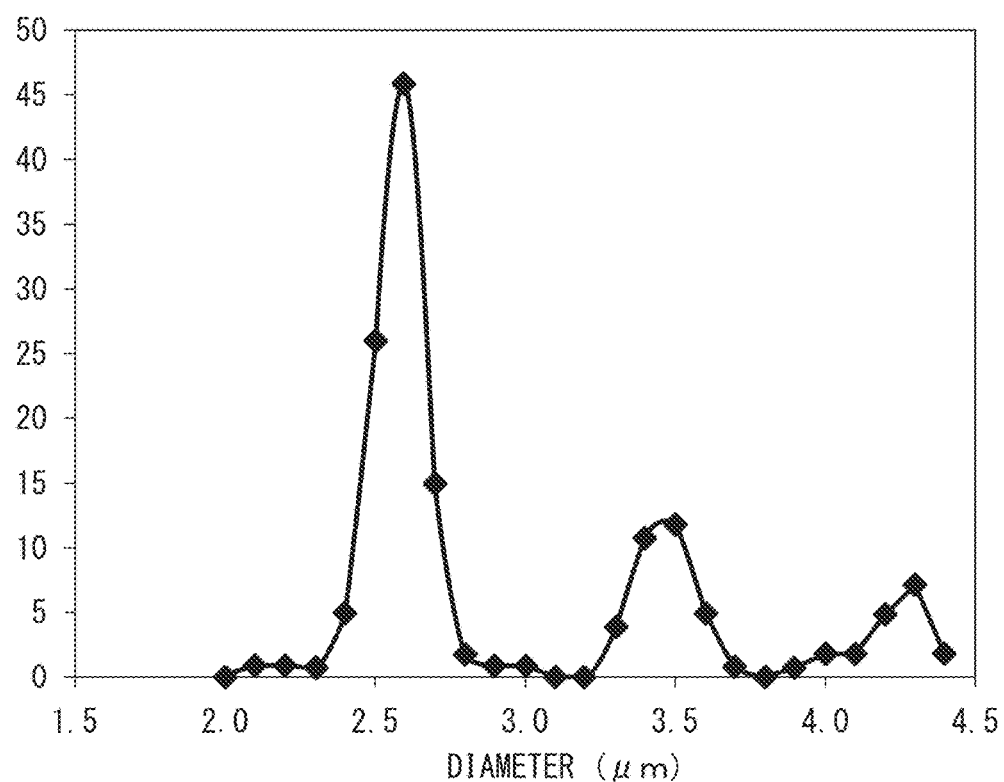
FIG. 6 is a distribution diagram illustrating a distribution of opening diameters of the respective light absorbing units 2 included in the antireflective structure 1.

In FIG. 6, one peak is observed at each of positions that are diameters of 2.6 µm, 3.5 µm, and 4.3 µm on the horizontal axis. This means that the antireflective structure 1 includes three types of light absorbing units 2 having an opening diameter of approximately 2.6 µm, 3.5 µm, or 4.3 µm.

The antireflective structure 1 is observed under an electron microscope, and is looked down along the height h1 direction of the light absorbing unit 2 to arbitrarily set a square region including 100 to 200 light absorbing units 2, and with respect to a total area of the region (100%), an opening rate in which a total area of the opening portions 2c of all the light absorbing units 2 included in the region occupies is preferably from 40 to 85%, more preferably from 50 to 85%, and even more preferably from 55 to 85%.

When the opening rate is greater than or equal to the lower limit value of the range described above, the antireflection property is further enhanced. From the view point of further enhancing these effects, the higher upper limit value of the range described above is the better, but 100% is not possible, and about 85% is considered to be a substantial limit.

The area of the opening portion 2c of each light absorbing unit 2 is determined by visual observation or image processing of the area of the region surrounded by the opening edge 2e of the light absorbing unit 2. When a part of the contiguous wall portion 2w surrounding the region is lacking, the area is determined, assuming that the opening edge 2e is continuously present even in the lacking region.

Figure 7:
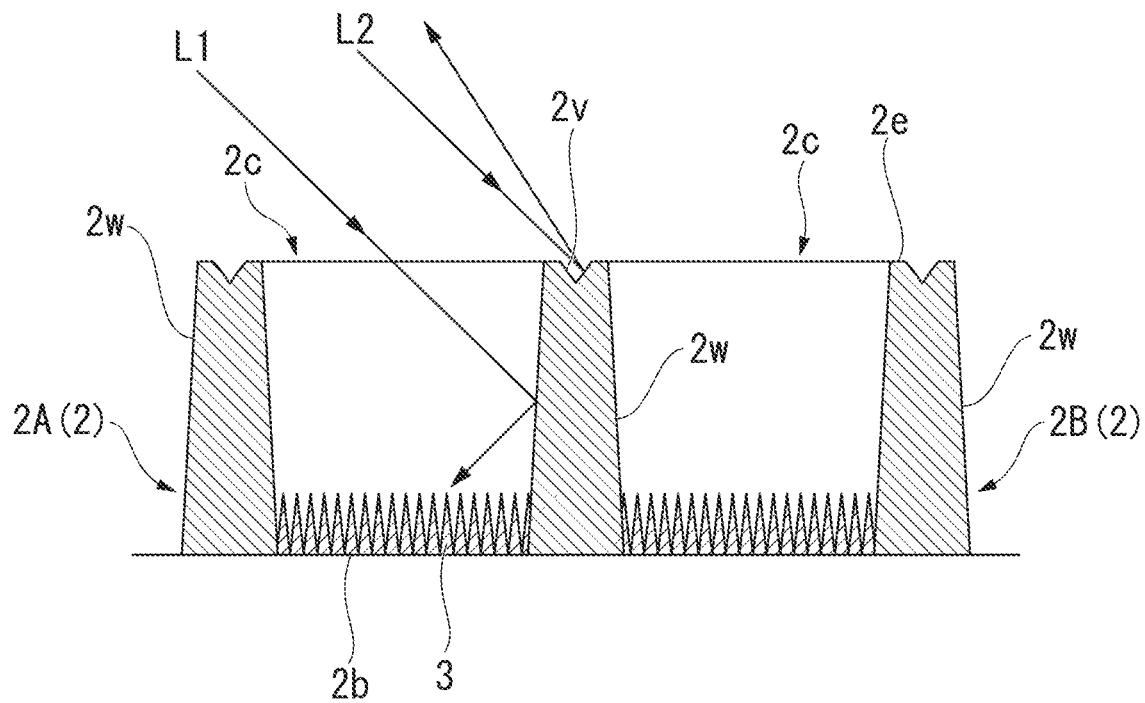
FIG. 7 is a schematic cross-sectional view, similar to FIG. 4, illustrating a state in which light rays L1, L2 incident on the antireflective structure 1 are absorbed or scattered.

As illustrated in FIG. 7, the light ray L1 incident on the antireflective structure 1 is incident to the inner space part from the opening portion 2c of the light absorbing unit 2, is reflected on an inner surface of the wall portion 2w, and is captured and absorbed by the pinching structure configured with the minute projections 3 standing in a group on the bottom portion 2b. On the other hand, the light ray L2 incident on the antireflective structure 1 is reflected on the upper surface of the wall portion 2w that is a wall portion common to both the first light absorbing unit 2A and the second light absorbing unit 2B.

Therefore, the smaller a gap between the opening portions 2c of the adjacent light absorbing units 2 is, the higher the antireflection property can be made to be.

With respect to the total area (100%) of the predetermined region in which the light absorbing units 2 of the antireflective structure 1 are formed, a total area of regions that are the gaps between the respective adjacent light absorbing units 2 is an area in which a total area occupied by the opening portions 2c of the light absorbing units 2 is subtracted from the total area (100%).

As illustrated in FIG. 7, the reason why the antireflection property of the antireflective structure 1 is degraded is that the light ray L2 incident on the upper surface of the wall portion 2w that is the wall portion common to both the first light absorbing unit 2A and the second light absorbing unit 2B is reflected. However, in the antireflective structure 1, the depression 2v is formed on the upper surface thereof, and therefore, at least the light ray L2 is prevented from regularly reflecting. By preventing the regular reflection (reflection whose incident angle is substantially equal to its reflection angle), a part of the target antireflection property is achieved.

Therefore, in looking down the antireflective structure 1 along the height h1 direction of the light absorbing unit 2, in a gap between the opening portions 2c of the adjacent light absorbing units 2, when the respective wall portions 2w of the adjacent light absorbing units 2 are integrated, the upper end of each of the integrated wall portions 2w is preferably depressed. When a cross section cut along the height h1 direction of the light absorbing unit 2 of the antireflective structure 1 is viewed, a depression 2v that is lower than heights of the respective opening edges 2e is formed on the upper end of the integrated wall portions 2w.

Figure 8:
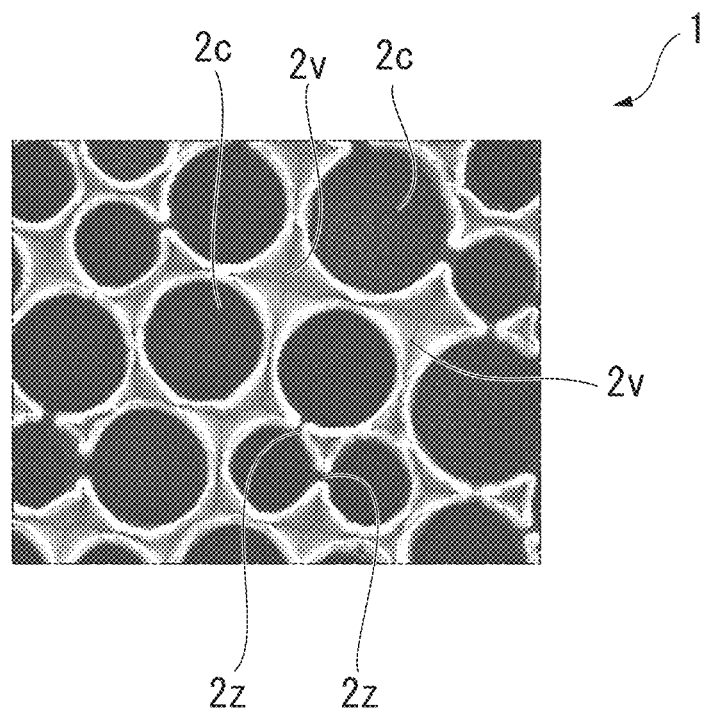
FIG. 8 is a SEM image in which a part of FIG. 5 is enlarged.

FIG. 8, in which FIG. 5 is enlarged, illustrates an electron micrograph (SEM image) of the upper surface of the antireflective structure 1. In this SEM image, multiple states each of which the depression (valley) 2v recessed in a V-shape is formed on the upper end of the integrated wall portions 2w of two to four adjacent light absorbing units 2 can be observed as black, narrow streaks. In addition, a portion 2z in which a part of the integrated wall portions 2w is lacking, and the inner space parts are communicated with each other is observed as a black, thick streak as distinguished from the depression 2v.

As is evident from the SEM image of the upper surfaces of the light absorbing units 2 illustrated in FIG. 8, each of the light absorbing units 2 configuring the antireflective structure 1 includes the substantially circular opening portion 2c. Therefore, regardless of an orientation of the incident light (a direction of a straight line where the light ray incident on the light absorbing unit 2 is projected on the upper surface of the light absorbing unit 2 as viewed from above), light incident from any direction of the whole orientation (360°) can be guided from the opening portion 2c of the light absorbing unit 2 to the inside of the light absorbing unit 2 and absorbed in the same manner. In other words, the antireflection property exhibited by the antireflective structure 1 is displayed evenly with respect to light incident from any direction regardless of the incident orientation of the light.

Method of Manufacturing Antireflective Structure

The antireflective structure according to the present invention can be produced in a large quantity by using a mold for manufacturing as follows, for example.

First, a surface of a substrate S that forms a mold is roughened by a publicly known method such as blasting.

As the degree of roughness of the surface, for example, an arithmetic average of roughness Ra is preferably approximately from 0.01 μm to 0.5 μm.

Figure 9A:
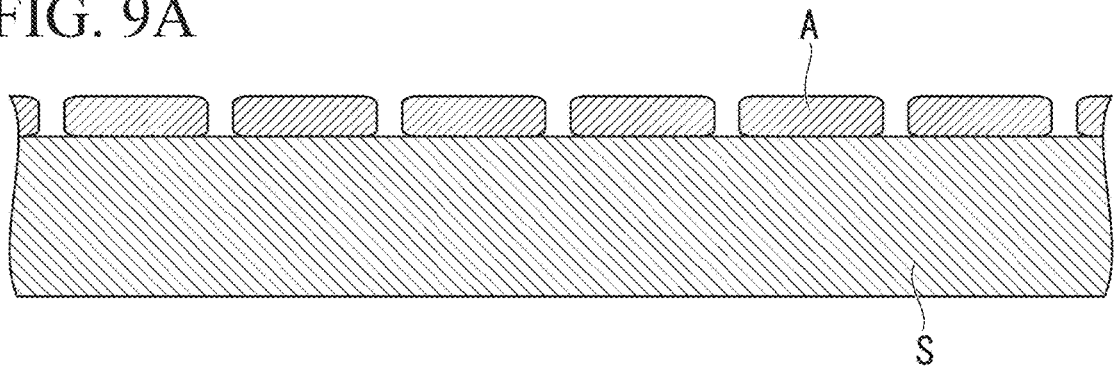
FIGS. 9A to 9D are schematic cross-sectional views illustrating an example of a method for producing a mold for producing the antireflective structure 1.

Next, as illustrated in FIG. 9A, multiple disks A, which are etching masks patterned by known photolithography or nanoimprint, are disposed on the surface of the substrate S that has been roughened. When viewed from above, the disk A is substantially circular, and a size and a shape of the disk A correspond to a size and a shape of the opening portion 2c of the light absorbing unit 2 of the antireflective structure 1. The disks A disposed on the surface of the substrate S do not contact each other on side surfaces, but are densely laid.

Figure 9B:
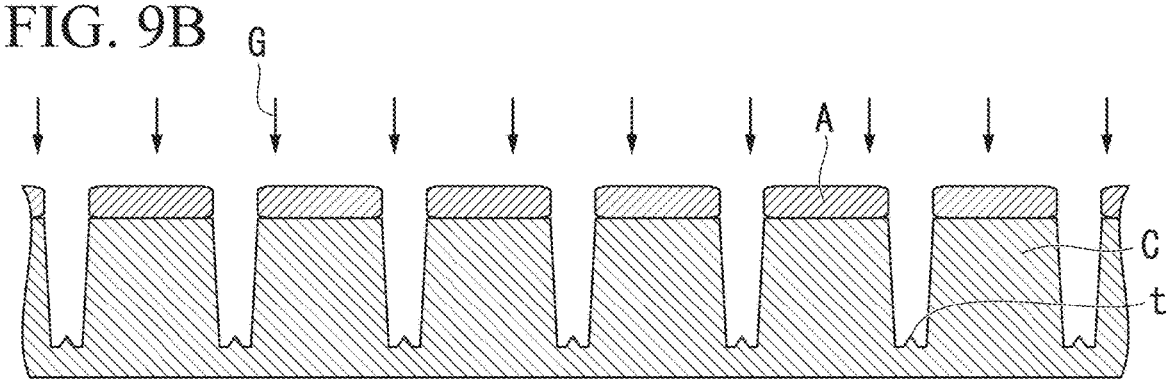

Next, as illustrated in FIG. 9B, when etching gas G is blown from above on a layer of the disks A that have been densely laid, the etching gas G that blows through a gap between the disks A etches the substrate S. Note that the etching gas G includes reactive gas, and ions and radicals ionized by plasma treatment. At this time, the disk A having etching resistance is not likely to be etched, and a thickness and a diameter of each disk A are diminished only a little, so each disk A has a function to prevent etching of the surface of the substrate. As a result, portions of the substrate S that are below the disk A remain almost unetched, so a group of cylindrical bodies C that stand with high density in a group, by reflecting the arrangement of the disks A, is formed on the surface of the substrate. On a bottom portion of a hole (a hole formed by etching) separating adjacent cylindrical bodies C, a projection t corresponding to the depression 2v described above is formed. The projection t is formed based on a slow etching rate below a location where the disks A are closest to each other.

Figure 9C:
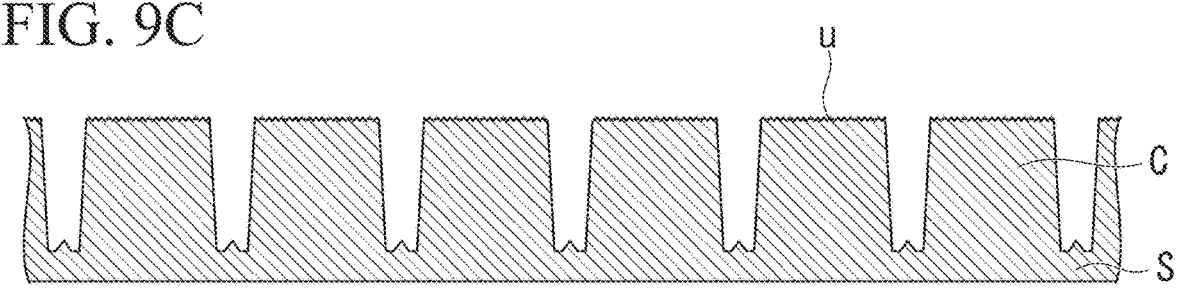

Subsequently, as illustrated in FIG. 9C, the disk A is removed from the etched substrate surface.

Roughness formed by roughening processing is retained on the substrate surface u on which the disk A is placed.

Figure 9D:
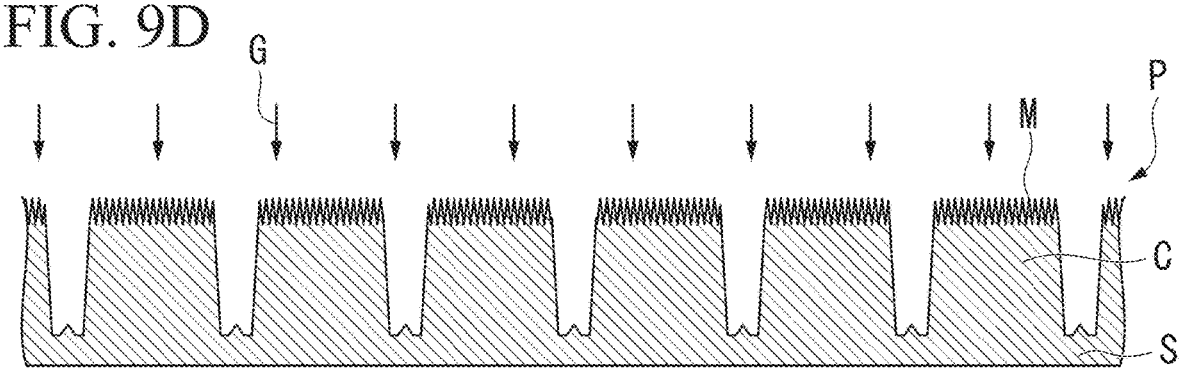

Finally, as illustrated in FIG. 9D, the etching gas G is blown on the rough substrate surface u after the disk A has been removed. Due to the roughness, there is a difference in the etching rate on the substrate surface u, and thus, as etching proceeds, a concave-convex group M corresponding to the pinching structure of the antireflective structure 1 is formed. The method described above provides an intended mold P.

As another method of producing a mold, the following method that does not use the photolithography or nanoimprint can be exemplified.

Figure 10A:
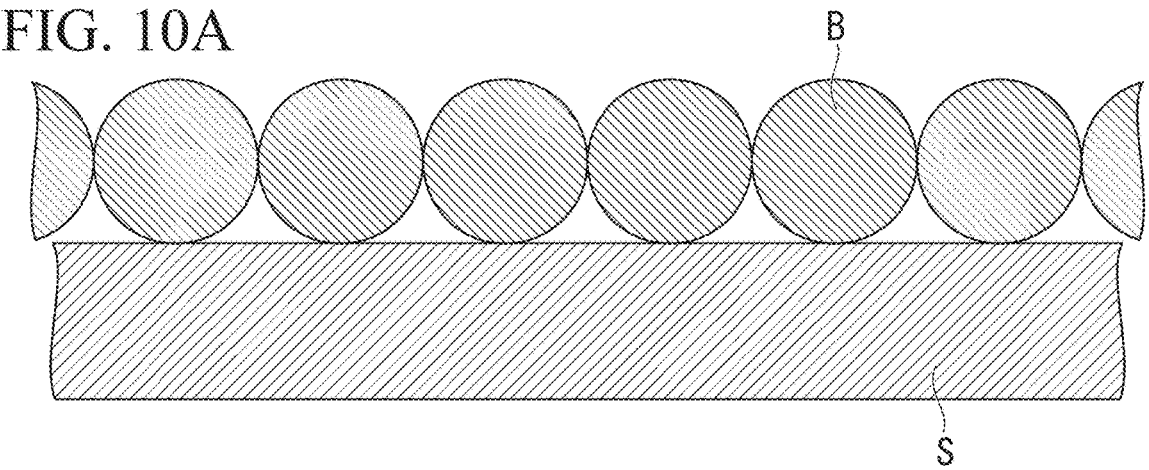
FIGS. 10A to 10D are schematic cross-sectional views illustrating another example of a method for producing a mold for producing the antireflective structure 1.

First, as illustrated in FIG. 10A, multiple fine particles B are sprayed on the substrate surface S, and the fine particles B are densely laid so as to come into contact with each other. However, a layer made from a single layer of fine particles B is formed on the substrate surface, without the fine particles B being stacked on top of the other fine particles B.

A shape of each fine particle B may be a spherical shape, or may be a shape other than the spherical shape, such as a spheroid. A diameter and a size of each of the fine particles B corresponds to the size of the opening portion 2c of the light absorbing unit 2 of the antireflective structure 1.

Figure 10B:
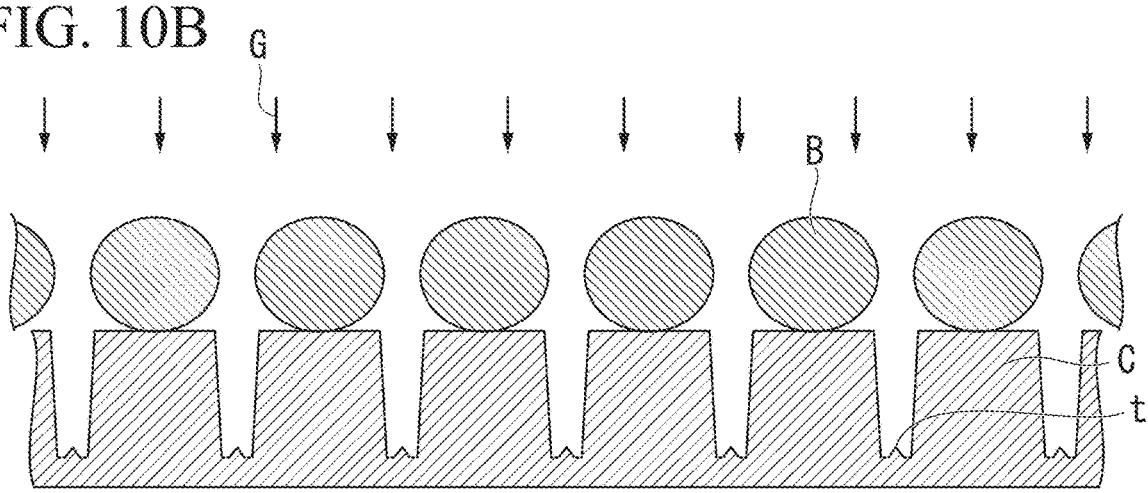

Next, as illustrated in FIG. 10B, when the etching gas G is blown from above to the layer of the fine particles B that have been densely laid, the etching gas G that blows through gaps between the respective fine particles B etches the substrate S. At this time, the fine particle B having etching resistance is not likely to be etched, and each fine particle B functions as a mask that prevents etching of the substrate surface because a height and a width of each particle are diminished only a little. As a result, portions of the substrate S that are below the fine particles B remain almost unetched, and thus a group of cylindrical bodies C that stand with high density in a group, by reflecting the arrangement of the fine particles B is formed on the substrate surface. On a bottom portion of a hole (a hole formed by etching) separating adjacent cylindrical bodies C, a projection t corresponding to the depression 2v described above is formed. The projection t is formed based on a slow etching rate below a contact between the fine particles B.

Figure 10C:
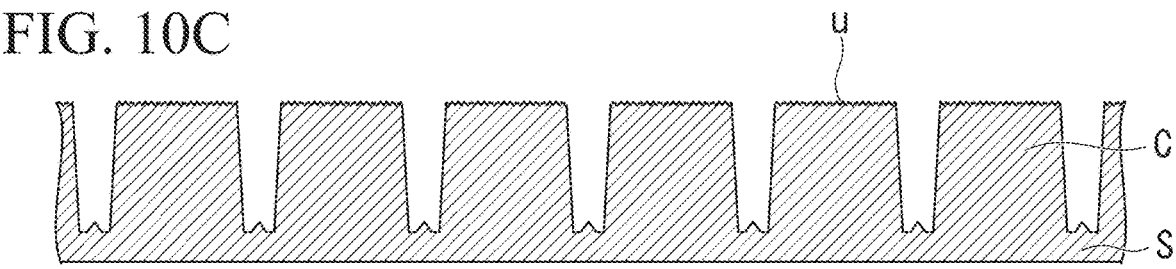

Next, as illustrated in FIG. 10C, the fine particles B are removed from the etched substrate surface. At this time, normally, the substrate surface u on which the fine particles B are mounted is a rough surface having roughness. It is thought that the reason for the roughness of the substrate surface u is that a residue derived from the fine particles B remains, or the etching gas that flows below the fine particles B during etching non-uniformly etches the substrate surface u.

Figure 10D:
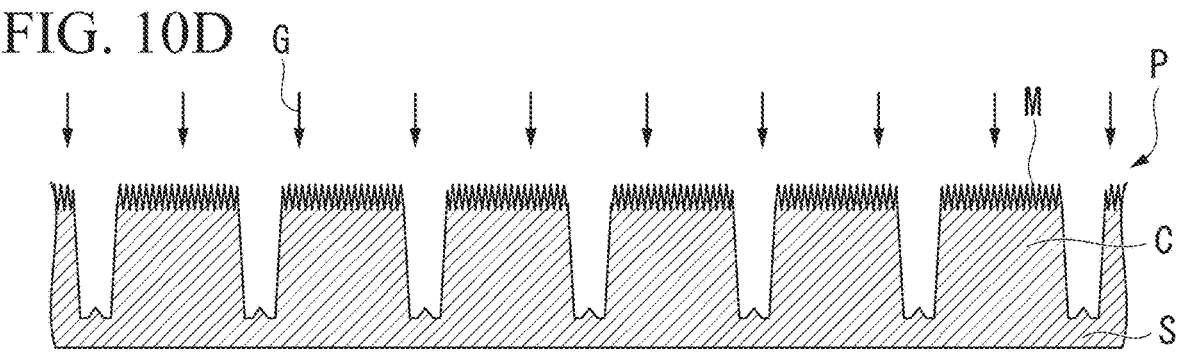

Finally, as illustrated in FIG. 10D, the etching gas G is blown onto the rough substrate surface u after the fine particles B have been removed. Due to the roughness, there is a difference in the etching rate on the substrate surface u, and thus, as etching proceeds, a concave-convex group M corresponding to the pinching structure of the antireflective structure 1 is formed. The method described above provides an intended mold P.

Figure 11:
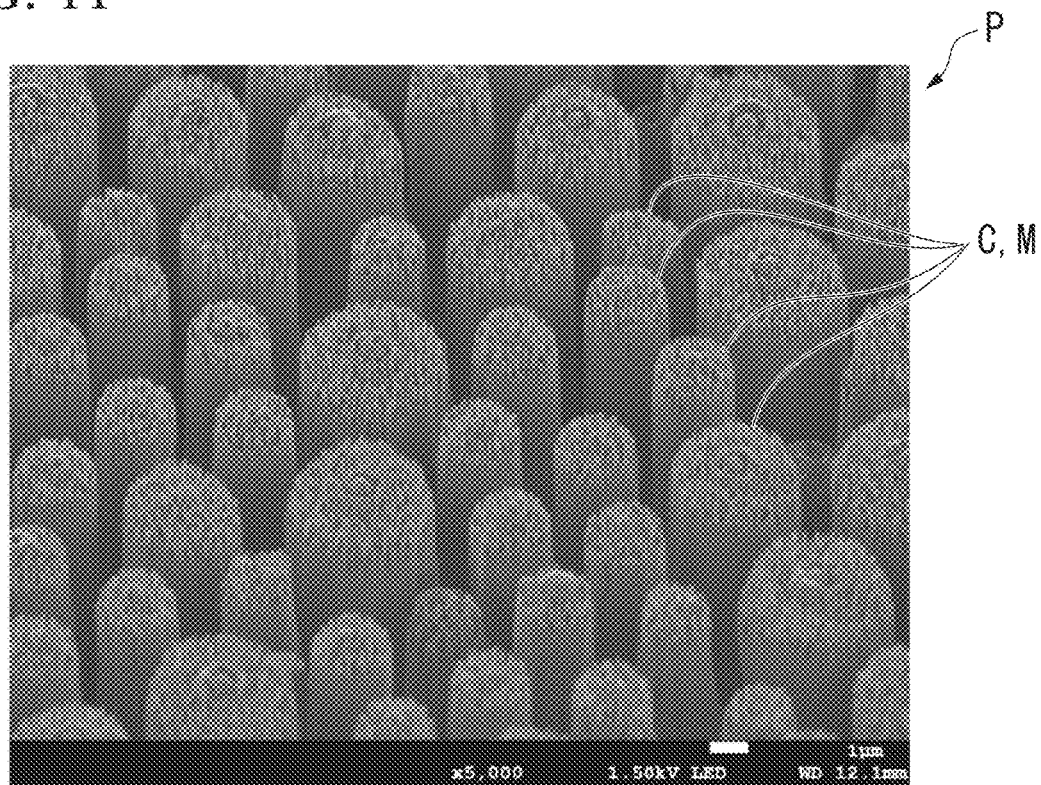
FIG. 11 is a perspective SEM image of an example of a mold for producing the antireflective structure 1.

An electron micrograph of the mold made by the method described above is illustrated in FIG. 11. It is observed that the cylindrical bodies C stand in a group and the concave-convex group M is formed on an upper surface of the cylindrical body C. Note that there is a relatively large eyeball shaped dot in the vicinity of a center of each concave-convex group M of some of the cylindrical bodies C, but this eyeball-shaped dot was only generated under certain conditions during the production of this mold, and a uniform concave-convex group M typically covers the upper surface of the cylindrical body C.

Figure 12:
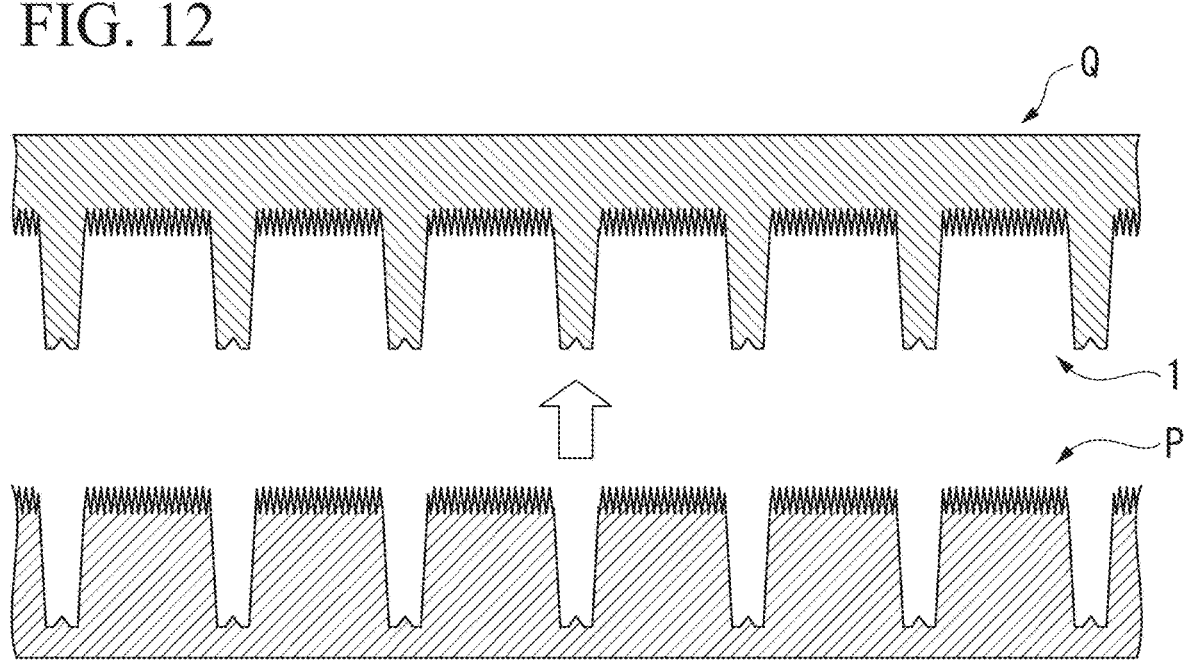
FIG. 12 is a schematic cross-sectional view illustrating a method for producing the antireflective structure 1 by using a mold.

As illustrated in FIG. 12, a cured product Q of which the antireflective structure 1 is formed on a surface is obtained by transferring the mold P made by the method described above to a synthetic resin such as a curable resin composition by using a known technique such as nanoimprint, press molding, or injection molding, and then removing the cured product from the mold after curing.

Examples of a form of the cured product Q include films, sheets, plates, and other molded bodies.

Material

Examples of a material of the substrate S that produces the mold P include Si, glass, quartz, and the like. Among these, Si is preferable because Si has excellent workability as an object to be etched and is widely used.

An example of the etching mask that configures the disk A densely laid on the surface of the substrate S includes, for example, a photoresist made from an organic inorganic hybrid material. A material capable of suitable patterning and suitable as a mask in the etching process, such as a known photosensitive functional polymeric material, is used. A liquid material containing a resist material to be used in photolithography is, for example, a mixture containing a polymer, a photosensitive agent, an additive agent, and a solvent as main components. In addition, the disk A may be a hard mask made from an inorganic compound formed by photolithography and reactive ion etching, and may be formed, for example, by a silicon nitride film or a silicon oxide film formed by a high-density plasma CVD method, or an LP-CVD method.

Of the above, photoresist is preferred because the material of the disk A is easily patterned with an etching mask.

A material of the fine particles B densely laid on the surface of the substrate S includes a metal such as Al, Au, Ti, Pt, Ag, Cu, Cr, Fe, Ni, Si, or W and a metal oxide such as $SiO_2$, $Al_2O_3$, $TiO_2$, $MgO_2$, or $CaO_2$. Also, a nitride such as SiN, or TiN, a carbide such as SiC, or WC, an organic polymer such as polystyrene, or polymethyl methacrylate, other semiconductor materials, and inorganic polymers, or the like is included. Furthermore, at least two types of these materials can be used in combination. Among the materials described above, the material of the fine particle B is preferably an inorganic oxide from the view point of having a high degree of freedom in etching selection ratio with respect to the substrate S. In addition, $SiO_2$ (silica) is more preferable among the inorganic oxides.

Depending on a type of the substrate S, as the etching gas for etching the substrate S, for example, one or more kinds of gas selected from the group consisting of Ar, $SF_6$, $F_2$, $CF_4$, $C_4F_8$, CSFs, $C_2F_6$, $C_3F_6$, $C_4F_6$, $CHF_3$, $CH_2F_2$, $CH_3F$, $C_3F_8$, $Cl_2$, $CCl_4$, $SiC1_4$, $BCl_2$, $BCl_3$, $BC_2$, $Br_2$, $Br_3$, HBr, $CBrF_3$, HCl, $CH_4$, $NH_3$, $O_2$, $H_2$, $N_2$, CO, and, $CO_2$ may be used. Among these, when the substrate S is made from Si, one or more kinds of gas selected from the group consisting of Ar, $SF_6$, $CF_4$, $C_2F_6$, $C_3F_6$, $C_4F_6$, $CHF_3$, $Cl_2$, $BCl_3$, $CH_4$, $NH_3$, $O_2$, $H_2$, $N_2$ are preferable, because of the commonly widely used gas. A dry etching method may be isotropic etching or anisotropic etching, but anisotropic etching is preferable in order to accurately reflect the shape of the mask. A type of dry etching is not particularly limited, and may be, for example, sputter etching, plasma etching, or reactive ion etching.

A material of the antireflective structure 1 is preferably a synthetic resin. Examples of synthetic resins include known synthetic resins such as thermoplastic resins, thermosetting resins, and photocurable resins. Synthetic resins such as polyethylene terephthalate (PET), triacetyl cellulose (TAC), polycarbonate (PC), cyclo olefin polymer (COP) and acrylic resin may be used as a preferred material. Additionally, a shape of the material may be, for example, a film form, a sheet form, a plate form, a block form, a lens form, a spherical form, or the like. The shape of the substrate 1 is not particularly limited and may be changed depending on the use/application thereof.

EXAMPLES

Example 1

By a procedure in which the mold P having a configuration similar to that of the substrate S illustrated in FIG. 10 was produced using the following procedure, and then the mold was transferred to a thermoplastic resin by using a thermal nanoimprint method, the antireflective structure was produced.

A 20 mass % aqueous dispersion of spherical colloidal silica having a nominal diameter of 3.0 μm was prepared. The aqueous dispersion was passed through a membrane filter having a pore size of 10 μmφ. Next, to the aqueous dispersion passed through the membrane filter, a phenyltriethoxysilane hydrolysate aqueous solution having a concentration of 1.0 mass % was added, the mixture was reacted at approximately 40° C. for three hours, and then the reaction solution was obtained. At this time, the aqueous dispersion and the hydrolysate aqueous solution were mixed such that the mass of the phenyltriethoxysilane was 0.02 times the mass of the colloidal silica particles.

Methyl ethyl ketone having a volume four times a volume of the obtained reaction solution was added to the obtained reaction solution and stirred thoroughly, hydrophobic colloidal silica was extracted in the oil phase, and then hydrophobic colloidal silica dispersion liquid having a concentration of 0.91 mass % was obtained.

The obtained hydrophobic colloidal silica dispersion liquid was dripped at a drip speed of 0.01 mL/second onto the liquid surface (water was used as the lower-layer water and the water temperature was 25° C.) in a water tank (LB trough apparatus). The water tank was fitted with a surface pressure sensor for measuring the surface pressure of a particle monolayer film and a moveable barrier for compressing the particle monolayer film in a direction along the liquid surface. In the lower-layer water of the water tank, a Si substrate (six inches) having a flat surface as the substrate was dipped in advance in a substantially vertical direction.

Thereafter, ultrasonic waves (having a power of 300 W and a frequency of 950 kHz) were irradiated for 10 minutes from within the lower-layer water toward the water surface to promote two-dimensional closest-packing of the particles while volatilizing the methyl ethyl ketone, which is the solvent of the dispersion liquid, to form a particle monolayer film.

Subsequently, this particle monolayer film was compressed by the moveable barrier until a diffusion pressure of 25 mNm$^{-1}$ was reached, and the substrate was then pulled up at a speed of 5 mm/minute, thereby transferring the particle monolayer film to one surface of the substrate.

Subsequently, a hydrolysate solution of 1 mass % monomethyltrimethoxysilane, which was used as a binder, was allowed to be permeated onto the substrate including the particle monolayer film formed thereon, and an excess of the hydrolysate solution was then removed by spin coater (3000 rpm) processing for one minute. Thereafter, heating was performed at 100° C. for 10 minutes to react the binder. Thus, the substrate including the particle monolayer film was obtained.

Subsequently, the obtained substrate including the particle monolayer film was subjected to dry etching by using the mixed gas of $CF_4$, $Cl_2$, and $O_2$. The etching conditions were the antenna power of 1500 W, the bias power of 1000 W, the gas flow rate of 100 sccm, and the etching time of 1000 seconds. Thereafter, the etched fine particles were removed by wiping and washing with water, and then dry etching was performed using $Cl_2$ gas to produce the mold P of Example 1.

By using the mold P of Example 1, the thermal nanoimprint was performed on a COP film at a pressure of 6.0 MPa and a treatment temperature of 150° C., and was cooled to room temperature, and then the antireflective structure of Example 1 was obtained.

When the antireflective structure of Example 1 was observed under a SEM, the wall portions of adjacent light absorbing units were integrated, and the upper end of the integrated wall portions was depressed. In addition, the size and the like of each portion were determined by the method described above and were as described below.

Average height of wall portions: 7.0 μm
Average opening diameter of opening portions: 2.6 μm (the number of peaks in distribution diagram: 1 (monomodal))
Opening rate: 60.2%
Pinching structure on bottom portion: yes
Average pitch of minute projections in pinching structure on bottom portion: 110 nm
Average height of minute projections in pinching structure on bottom portion: 750 nm Example 2

Each 20 mass % aqueous dispersion of three types of spherical colloidal silica with a nominal diameter of 3.0 μm, 4.0 μm, or 5.0 μm was prepared, and an aqueous dispersion mixed at a weight ratio of 1:1:1 was prepared. Other than these conditions, a method similar to that of Example 1 was used, and the mold P of Example 2 was produced. Thereafter, the antireflective structure of Example 2 was obtained using the same method as that in Example 1.

When the antireflective structure of Example 2 was observed under a SEM, the wall portions of adjacent light absorbing units were integrated, and the upper end of the integrated wall portions was depressed. In addition, the size and the like of each portion were determined by the method described above and were as described below.

Average height of wall portions: 7.0 μm
Average opening diameter of opening portions: 2.6 μm, 3.5 μm, 4.3 μm (the number of peaks in distribution diagram: 3 (multimodal))
Opening rate: 55.2%
Pinching structure on bottom portion: yes
Average pitch of minute projections in pinching structure on bottom portion: 110 nm
Average height of minute projections in pinching structure on bottom portion: 750 nm Example 3

A substrate with a particle monolayer film was obtained by the same method as that in Example 2. Thereafter, dry etching was performed using a mixed gas of $CF_4$ and $Cl_2$. The etching conditions were the antenna power of 1500 W, the bias power of 800 W, the gas flow rate of 100 sccm, and the etching time of 1500 seconds. Thereafter, the etched fine particles were removed by wiping and washing with water, and then dry etching was performed using a $Cl_2$ gas to produce the mold P of Example 3. Thereafter, the antireflective structure of Example 3 was obtained using the same method as that in Example 1.

When the antireflective structure of Example 3 was observed under a SEM, the wall portions of adjacent light absorbing units were integrated, and the upper end of the integrated wall portions was depressed. In addition, the size and the like of each portion were determined by the method described above and were as described below.

Average height of wall portions: 13.0 μm
Average opening diameter of opening portions: 2.6 μm, 3.5 μm, 4.3 μm (the number of peaks in distribution diagram: 3 (multimodal))
Opening rate: 56.1%
Pinching structure on bottom portion: yes
Average pitch of minute projections in pinching structure on bottom portion: 110 nm
Average height of minute projections in pinching structure on bottom portion: 750 nm Comparative Example 1

A substrate with a particle monolayer film was obtained by the same method as that in Example 1. Thereafter, dry etching was performed using a mixed gas of $CF_4$, $Cl_2$, and $O_2$. The etching conditions were the antenna power of 1500 W, the bias power of 1200 W, the gas flow rate of 100 sccm, and the etching time of 800 seconds, treatment was performed until the particles disappeared, and the mold P of Comparative Example 1, which had no pinching structure on the tip of a structure, was produced. Thereafter, the antireflective structure of Comparative Example 1 was obtained using the same method as that in Example 1.

When the antireflective structure of Comparative Example 1 was observed under a SEM, the wall portions of adjacent light absorbing units were integrated, but the upper end of the integrated wall portions was not depressed and was substantially flat.

In addition, the size and the like of each portion were determined by the method described above and were as described below.

Average height of wall portions: 7.0 μm
Average opening diameter of opening portions: 2.6 μm (the number of peaks in distribution diagram: 1 (monomodal))
Opening rate: 60.2%
Pinching structure on bottom portion: none Comparative Example 2

A substrate with a particle monolayer film was obtained by the same method as that in Example 2. Thereafter, dry etching was performed using a mixed gas of $CF_4$, $Cl_2$, and $O_2$. The etching conditions were the antenna power of 1500 W, the bias power of 1000 W, the gas flow rate of 100 sccm, and the etching time of 1000 seconds. Thereafter, the etched fine particles were removed by wiping and washing with water, and then dry etching was performed using a mixed gas of $CF_4$ and $Cl_2$ with etching conditions different from those of Example 1 to produce the mold P of Comparative Example 2, which had no pinching structure on the tip of a structure. Thereafter, the antireflective structure of Comparative Example 2 was obtained using the same method as that in Example 1.

When the antireflective structure of Comparative Example 2 was observed under a SEM, the wall portions of adjacent light absorbing units were integrated, but the upper end of the integrated wall portions was not depressed and was substantially flat.

In addition, the size and the like of each portion were determined by the method described above and were as described below.

Average height of wall portions: 7.0 μm
Average opening diameter of opening portions: 2.6 μm, 3.5 μm, 4.3 μm (the number of peaks in distribution diagram: 3 (multimodal))
Opening rate: 48.0%
Pinching structure on bottom portion: none Evaluation of Antireflection Property To confirm the antireflection properties of the antireflective structures produced in the examples and comparative examples, the luminous sensitivity correction reflectances (Y value) were evaluated using a spectrophotometer V-770 manufactured by JASCO Corporation. The lower a numerical value of the Y value is, the lower reflectivity is and the superior antireflection property is indicated.

TABLE 1

| | Average Opening Diameter (μm) | Average Height of Wall Portions (μm) | Opening Rate (%) | Pinching Structure on Bottom Portion | Luminous Sensitivity Correction Reflectance (Y (%)) |
|---|---|---|---|---|---|
| Example 1 | 2.6 | 7.0 | 60.2 | Yes | 1.18 |
| Example 2 | 2.6/3.5/4.3 | 7.0 | 55.2 | Yes | 0.79 |
| Example 3 | 2.6/3.5/4.3 | 13.0 | 56.1 | Yes | 0.42 |
| Comparative Example 1 | 2.6 | 7.0 | 60.2 | None | 1.89 |
| Comparative Example 2 | 2.6/3.5/4.3 | 7.0 | 48.0 | None | 1.64 |

Evaluation Results and Consideration

As a result of the above evaluation, it was confirmed that the antireflective structure according to the present invention clearly has an excellent antireflection property because the antireflective structure according to the present invention has the pinching structure on the bottom portion.

INDUSTRIAL APPLICABILITY

The present invention can be widely applied in the field of resin molded articles such as antireflective sheets.

REFERENCE SIGNS LIST

1 Antireflective structure
2 Light absorbing unit
2a Outer edge portion
2b Bottom portion
2c Opening portion
2e Opening edge
2w Wall portion
2v Depression
2z Communication portion
3 Minute projection
L1 Incident light
L2 Incident light
A Disk configured with resist
B Fine particle
S Substrate
C Cylindrical body
G Etching gas
t Projection
u Substrate surface
M Concave-convex group
P Mold
Q Cured product

What is claimed is:

1. An antireflective structure comprising:
a plurality of light absorbing units each of which has a bottomed cylindrical shape, wherein the light absorbing unit includes a bottom portion including an outer edge portion having a substantially circular shape, and a wall portion rising along the outer edge portion, wherein an upper side of the bottom portion is an opening portion, wherein
an average height of the wall portions is greater than or equal to 5 μm and less than or equal to 100 μm,
an average opening diameter of the opening portions is greater than or equal to 1 μm and less than or equal to 10 μm, and
a pinching structure configured with minute projections that stand in a group with an average pitch being greater than or equal to 10 nm and less than or equal to 500 nm formed on the bottom portion,
wherein the plurality of light absorbing units are configured such that a light ray incident on the wall portion is reflected onto the pinching structure on the opening portion, such that the light is captured and absorbed by the pinching structure.

2. The antireflective structure according to claim 1, wherein an average height of the minute projections is greater than or equal to 0.1 μm and less than or equal to 4 μm.

3. The antireflective structure according to claim 1, wherein when the antireflective structure is viewed along a height direction of the light absorbing unit, a square region including the 100 to 200 light absorbing units is arbitrarily set, and
a diameter of a minimum circle including the opening portion for each light absorbing unit included in the region is individually measured at an interval of 0.1 μm, and two or more peaks are observed in a diagram with the diameter taken as a horizontal axis, and with the number of light absorbing units having the diameter taken as a vertical axis.

4. The antireflective structure according to claim 3, wherein for the two or more peaks, a difference in diameter between adjacent peaks is greater than or equal to 0.3 μm.

5. The antireflective structure according to claim 1, wherein the wall portions of the adjacent light absorbing units are integrated, and an upper end of the integrated wall portions is depressed.

6. The antireflective structure according to claim 2,
wherein when the antireflective structure is viewed along a height direction of the light absorbing unit, a square region including the 100 to 200 light absorbing units is arbitrarily set, and
a diameter of a minimum circle including the opening portion for each light absorbing unit included in the region is individually measured at an interval of 0.1 μm, and two or more peaks are observed in a diagram with the diameter taken as a horizontal axis, and with the number of light absorbing units having the diameter taken as a vertical axis.

7. The antireflective structure according to claim 6, wherein for the two or more peaks, a difference in diameter between adjacent peaks is greater than or equal to 0.3 μm.

8. The antireflective structure according to claim 3, wherein the wall portions of the adjacent light absorbing units are integrated, and an upper end of the integrated wall portions is depressed.

9. An antireflective structure comprising:
a plurality of light absorbing units each of which has a bottomed cylindrical shape, wherein the light absorbing unit includes a bottom portion including an outer edge portion having a substantially circular shape, and a wall portion rising along the outer edge portion, wherein an upper side of the bottom portion is an opening portion, wherein
an average height of the wall portions is greater than or equal to 5 μm and less than or equal to 100 μm,
an average opening diameter of the opening portions is greater than or equal to 1 μm and less than or equal to 10 μm, and
a pinching structure configured with minute projections that stand in a group with an average pitch being greater than or equal to 10 nm and less than or equal to 500 nm formed on the bottom portion,
wherein when the antireflective structure is viewed along a height direction of the light absorbing unit, a square region including the 100 to 200 light absorbing units is arbitrarily set, and
a diameter of a minimum circle including the opening portion for each light absorbing unit included in the region is individually measured at an interval of 0.1 μm, and two or more peaks are observed in a diagram with the diameter taken as a horizontal axis, and with the number of light absorbing units having the diameter taken as a vertical axis.

10. An antireflective structure comprising:
a plurality of light absorbing units each of which has a bottomed cylindrical shape, wherein the light absorbing unit includes a bottom portion including an outer edge portion having a substantially circular shape, and a wall portion rising along the outer edge portion, wherein an upper side of the bottom portion is an opening portion, wherein
an average height of the wall portions is greater than or equal to 5 μm and less than or equal to 100 μm,
an average opening diameter of the opening portions is greater than or equal to 1 μm and less than or equal to 10 μm, and
a pinching structure configured with minute projections that stand in a group with an average pitch being greater than or equal to 10 nm and less than or equal to 500 nm formed on the bottom portion,
wherein when the antireflective structure is viewed along a height direction of the light absorbing unit, a square region including the 100 to 200 light absorbing units is arbitrarily set, and
a diameter of a minimum circle including the opening portion for each light absorbing unit included in the region is individually measured at an interval of 0.1 μm, and two or more peaks are observed in a diagram with the diameter taken as a horizontal axis, and with the number of light absorbing units having the diameter taken as a vertical axis,
wherein an average height of the minute projections is greater than or equal to 0.1 μm and less than or equal to 4 μm.

\* \* \* \* \*